(12) United States Patent
Zhao et al.

(10) Patent No.: US 10,782,933 B2
(45) Date of Patent: Sep. 22, 2020

(54) COMPUTER DATA PROCESSING METHOD AND APPARATUS FOR LARGE NUMBER OPERATIONS

(71) Applicant: Alibaba Group Holding Limited, George Town (KY)

(72) Inventors: Yuan Zhao, Hangzhou (CN); Shan Yin, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/779,073

(22) Filed: Jan. 31, 2020

(65) Prior Publication Data
US 2020/0167128 A1    May 28, 2020

Related U.S. Application Data

(63) Continuation of application No. PCT/CN2020/070620, filed on Jan. 7, 2020.

(30) Foreign Application Priority Data

Apr. 28, 2019  (CN) .......................... 2019 1 0349581

(51) Int. Cl.
*G06F 7/53* (2006.01)
*G06F 7/496* (2006.01)
(Continued)

(52) U.S. Cl.
CPC ............ *G06F 7/5324* (2013.01); *G06F 7/496* (2013.01); *G06F 7/533* (2013.01); *G06F 7/74* (2013.01); *G06F 9/30101* (2013.01)

(58) Field of Classification Search
None
See application file for complete search history.

(56) References Cited

U.S. PATENT DOCUMENTS

| 5,825,681 A * | 10/1998 | Daniel | G06F 7/5324 |
| | | | 708/654 |
| 6,567,834 B1 * | 5/2003 | Marshall | G06F 7/527 |
| | | | 708/626 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Michael D. Yaary
(74) *Attorney, Agent, or Firm* — Fish & Richardson P.C.

(57) ABSTRACT

Implementations of this specification provide a method and apparatus for computer data processing for large number operations. An example method performed by a computing device includes splitting a multiplier and a multiplicand into respective four 64-bit numbers from most significant bits to least significant bits; reading the split multipliers and the split multiplicands into a register; and obtaining a multiplication processing result for the multiplier and the multiplicand by performing operations including: classifying the split multipliers and the split multiplicands into groups of data pairs, calculating multiplication results of the groups of data pairs one by one, performing accumulation on multiplication results of data pairs in each group, and storing an accumulation result corresponding to the data pairs in memory as the multiplication processing result for the multiplier and the multiplicand.

18 Claims, 6 Drawing Sheets

---

Separately split a multiplier a and a multiplicand b into four 64-bit numbers from most significant bits to least significant bits, to obtain split multipliers and split multiplicands, respectively, where the split multipliers include a[3], a[2], a[1], and a[0], and the split multiplicands include b[3], b[2], b[1], and b[0]  — 102

Read the split multipliers and the split multiplicands into a register, and multiply the split multipliers and the split multiplicands based on a predetermined rule to obtain a target multiplication result  — 104

(51) Int. Cl.
*G06F 9/30* (2018.01)
*G06F 7/74* (2006.01)
*G06F 7/533* (2006.01)

(56) References Cited

U.S. PATENT DOCUMENTS

| | | | |
|---|---|---|---|
| 2002/0110241 A1* | 8/2002 | Chen | G06F 7/723 380/44 |
| 2002/0120658 A1* | 8/2002 | Chen | G06F 7/728 708/491 |
| 2017/0097824 A1* | 4/2017 | Elmer | G06F 9/3001 |

OTHER PUBLICATIONS

Nakamoto, "Bitcoin: A Peer-to-Peer Electronic Cash System," www.bitcoin.org, 2005, 9 pages.

* cited by examiner

```
┌─────────────────────────────────────────────────────────────────────┐
│ Separately split a multiplier a and a multiplicand b into four 64-bit numbers from most │
│ significant bits to least significant bits, to obtain split multipliers and split multiplicands, │ ─ 102
│ respectively, where the split multipliers include a[3], a[2], a[1], and a[0], and the split │
│                multiplicands include b[3], b[2], b[1], and b[0]                │
└─────────────────────────────────────────────────────────────────────┘
                                    │
                                    ▼
┌─────────────────────────────────────────────────────────────────────┐
│ Read the split multipliers and the split multiplicands into a register, and multiply the split │
│       multipliers and the split multiplicands based on a predetermined rule to       │ ─ 104
│                      obtain a target multiplication result                      │
└─────────────────────────────────────────────────────────────────────┘
```

FIG. 1

|       |       |       | a[3]    | a[2]    | a[1]    | a[0]    |
|       |       |       | b[3]    | b[2]    | b[1]    | b[0]    |
|       |       | a[3]b[0] | a[2]b[0] | a[1]b[0] | a[0]b[0] |
|       | a[3]b[1] | a[2]b[1] | a[1]b[1] | a[0]b[1] |
| a[3]b[2] | a[2]b[2] | a[1]b[2] | a[0]b[2] |
| a[3]b[3] | a[2]b[3] | a[1]b[3] | a[0]b[3] |

COMPUTER DATA PROCESSING METHOD AND APPARATUS FOR LARGE NUMBER OPERATIONS

CROSS-REFERENCE TO RELATED APPLICATIONS

This application is a continuation of PCT Application No. PCT/CN2020/070620, filed on Jan. 7, 2020, which claims priority to Chinese Patent Application No. 201910349581.2, filed on Apr. 28, 2019, and each application is hereby incorporated by reference in its entirety.

TECHNICAL FIELD

The present specification relates to the field of computer technologies, and in particular, to a computer data processing method and apparatus.

BACKGROUND

With development of technology, computer technologies are constantly developing, and complexity of data processing is increasing. Data processing in big number operation is increasingly needed, for example, 256-bit modular multiplication is usually needed in a cryptographic algorithm. Big number operation is an operation with a very large value or very high precision. Because of the limited range of the basic numerical data types provided by programming languages, large-scale high-precision numerical calculation cannot be satisfied. The big number operation is usually associated with computer hardware. How to implement efficient and convenient operation and processing of computer data is a technical problem to be urgently solved in the field.

SUMMARY

An objective of implementations of the present specification is to provide a computer data processing method and apparatus, so as to implement quick calculation of 256-bit multiplication, improve data processing efficiency, and lay a data foundation for data processing such as cryptography and big integer operation.

According to an aspect, an implementation of the present specification provides a computer data processing method, where the method is used to implement multiplication data processing of two 256-bit numbers, and includes the following: separately splitting a multiplier a and a multiplicand b into four 64-bit numbers from most significant bits to least significant bits, to obtain split multipliers and split multiplicands, respectively, where the split multipliers include a[3], a[2], a[1], and a[0], and the split multiplicands include b[3], b[2], b[1], and b[0]; reading the split multipliers and the split multiplicands into a register, and multiplying the split multipliers and the split multiplicands based on a predetermined rule to obtain a multiplication processing result of target data, where the predetermined rule includes the following: the split multipliers and the split multiplicands are classified into seven groups of data pairs, a first group of data pairs includes a[0]b[0], a second group of data pairs includes a[1]b[0] and a[0]b[1], a third group of data pairs includes a[2]b[0], a[1]b[1], and a[0]b[2], a fourth group of data pairs includes a[3]b[0], a[2]b[1], a[1]b[2], and a[0]b[3], a fifth group of data pairs includes a[3]b[1], a[2]b[2], and a[1]b[3], a sixth group of data pairs includes a[3]b[2] and a[2]b[3], and a seventh group of data pairs includes a[3]b[3]; calculating multiplication results of the first group of data pairs to the seventh group of data pairs one by one, and performing intra-group accumulation on multiplication results of data pairs in each group, where the intra-group accumulation includes the following: in the same group of data pairs, a calculated multiplication result of each data pair is accumulated with a multiplication result of a previous data pair within the group, 64 least significant bits of a final accumulation result of the data pairs in the same group are stored in a memory, a remaining accumulation result of the corresponding group of data pairs is obtained, and a corresponding register is released; and accumulating a multiplication result of the first data pair in each group of data pairs with a remaining accumulation result of a previous group of data pairs, accumulating an accumulation result with a multiplication result of a next data pair until accumulation of multiplication results of the data pairs in the seventh group of data pairs is completed, and then storing the accumulation result corresponding to the data pairs in the seventh group of data pairs in a memory to obtain the multiplication processing result of the target data.

In an implementation of the present specification, the method further includes the following: releasing a register that stores the multiplication result of each data pair when accumulating the multiplication results of each group of data pairs, and storing an accumulation result in three registers.

Further, in an implementation of the present specification, the method is applied to a 64-bit computer operating system.

In an implementation of the present specification, the method further includes the following: randomly selecting four registers from registers RBX, RBP, R12, R13, R14, and R15 of the 64-bit computer operating system, and storing values of the selected registers in the memory; and obtaining the stored values of the selected registers from the memory after the target multiplication result is calculated, and restoring the values of the selected registers.

In an implementation of the present specification, the method further includes the following: selecting registers RAX, RCX, RDX, RSI, RDI, R8, R9, R10, and R11 from the 64-bit computer operating system, where the selected registers are all used for data storage in a data processing procedure.

According to another aspect, the present specification provides a computer data processing apparatus, where the apparatus is configured to implement multiplication data processing of two 256-bit numbers, and includes the following: a data splitting module, configured to separately split a multiplier a and a multiplicand b into four 64-bit numbers from most significant bits to least significant bits, to obtain split multipliers and split multiplicands, respectively, where the split multipliers include a[3], a[2], a[1], and a[0], and the split multiplicands include b[3], b[2], b[1], and b[0]; and a data processing module, configured to: read the split multipliers and the split multiplicands into a register, and multiply the split multipliers and the split multiplicands based on a predetermined rule to obtain a multiplication processing result of target data, where the predetermined rule includes the following: the split multipliers and the split multiplicands are classified into seven groups of data pairs, a first group of data pairs includes a[0]b[0], a second group of data pairs includes a[1]b[0] and a[0]b[1], a third group of data pairs includes a[2]b[0], a[1]b[1], and a[0]b[2], a fourth group of data pairs includes a[3]b[0], a[2]b[1], a[1]b[2], and a[0]b[3], a fifth group of data pairs includes a[3]b[1], a[2]b[2], and a[1]b[3], a sixth group of data pairs includes a[3]b[2] and a[2]b[3], and a seventh group of data pairs includes a[3]b[3]; calculate multiplication results of the first group of data pairs to the seventh group of data pairs one by one, and perform intra-group accumulation on multiplication results of data pairs in each group, where the intra-group accumulation includes the following: in the same group of data pairs, a calculated multiplication result of each data pair is accumulated with a multiplication result of a previous data pair within the group, 64 least significant bits of a final accumulation result of the data pairs in the same group are stored in a memory, a remaining accumulation result of the corresponding group of data pairs is obtained, and a corresponding register is released; and accumulate a multiplication result of the first data pair in each group of data pairs with a remaining accumulation result of a previous group of data pairs, accumulate an accumulation result with a multiplication result of a next data pair until accumulation of multiplication results of the data pairs in the seventh group of data pairs is completed, and then store the accumulation result corresponding to the data pairs in the seventh group of data pairs in a memory to obtain the multiplication processing result of the target data.

Further, in an implementation of the present specification, the data processing module is configured to: release a register that stores the multiplication result of each data pair when accumulating the multiplication results of each group of data pairs, and store an accumulation result in three registers.

Further, in an implementation of the present specification, the apparatus is applied to a 64-bit computer operating system.

Further, in an implementation of the present specification, the apparatus further includes a register preparation module, configured to: randomly select four registers from registers RBX, RBP, R12, R13, R14, and R15 of the 64-bit computer operating system, and store values of the selected registers in the memory; and obtain the stored values of the selected registers from the memory after the target multiplication result is calculated, and restore the values of the selected registers.

Further, in an implementation of the present specification, the register preparation module is further configured to: select registers RAX, RCX, RDX, RSI, RDI, R8, R9, R10, and R11 from the 64-bit computer operating system, where the selected registers are all used for data storage in a data processing procedure.

According to still another aspect, the present specification provides a computer device, including the following: at least one 64-bit processor, a memory for storing a processor-executable 64-bit instruction, and at least 13 64-bit registers, where the processor executes the 64-bit instruction to implement the previous computer data processing method.

According to the computer data processing method and apparatus and the processing device provided in the present specification, a 256-bit multiplication operation is implemented, two pieces of 256-bit data are split into 64-bit data, and then the split data is calculated based on a predetermined rule. In the whole calculation process, multiplication results of all groups of data pairs are calculated one by one, and accumulated on a per-group basis. After accumulation of the multiplication results of all groups of data pairs is completed, 64 least significant bits of the accumulation result are stored in a memory, and a corresponding register is released. The accumulation is performed immediately upon multiplication. After a group of data pairs is accumulated, a register of 64 least significant bits is released immediately. Such operation mode occupies fewer registers so that only registers instead of caches and memories are accessed in the whole operation process, improving data processing efficiency and implementing quick operation of 256-bit multiplication. The calculated multiplication processing result lays a data foundation for data processing such as cryptography and big integer operation.

BRIEF DESCRIPTION OF DRAWINGS

To describe technical solutions in implementations of the present specification or in the existing technology more clearly, the following briefly describes the accompanying drawings needed for describing the implementations or the existing technology. Apparently, the accompanying drawings in the following descriptions merely show some implementations of the present specification, and a person of ordinary skill in the art can still derive other drawings from these accompanying drawings without creative efforts.

FIG. 1 is a schematic flowchart illustrating a computer data processing method, according to an implementation of the present specification;

FIG. 2 is a schematic diagram of grouping data pairs, according to an implementation of the present specification;

DESCRIPTION OF IMPLEMENTATIONS

Figure 3:
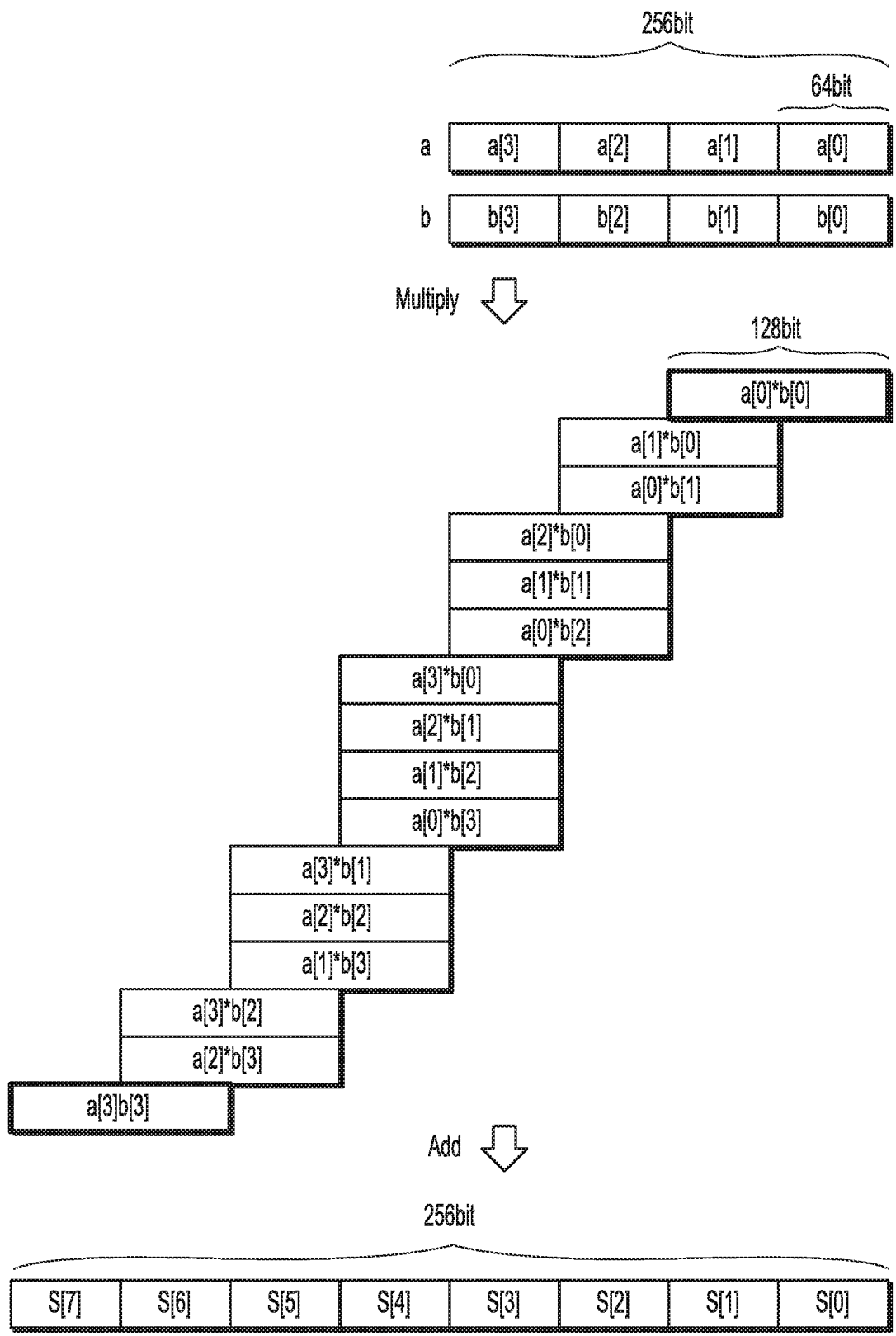
FIG. 3 is a schematic flowchart illustrating a 256-bit multiplication operation, according to an implementation of the present specification.

To make a person skilled in the art better understand the technical solutions in the present specification, the following clearly describes the technical solutions in the implementations of the present specification with reference to the accompanying drawings in the implementations of the present specification. Apparently, the described implementations are merely some but not all of the implementations of the present specification. All other implementations obtained by a person of ordinary skill in the art based on the implementations of the present specification without creative efforts shall fall within the protection scope of the present specification.

More application scenarios need a big integer operation, which can be implemented through computer programming by using a data processing capability of a computer. For example, big integer multiplication is widely used in a public key cryptographic algorithm. An elliptic curve algorithm in the cryptographic algorithm uses 256-bit modular multiplication, such as National Cipher SM2 (the elliptic curve public key cryptographic algorithm published by the State Cryptography Administration of China) or NIST 256r1 ECDSA (the elliptic curve digital signature algorithm published by the NIST of the United States). Because SM2 and NIST 256r1 use a special pseudo-Mersenne prime number, the modulus of 256 bits can be quickly reduced, so the 256-bit modular multiplication can be calculated by first calculating 256-bit multiplication and then performing a modulo operation through quick reduction. As such, the 256-bit multiplication accounts for about half of the computation amount of SM2 and NIST 256r1 ECDSA. The 256-bit multiplication can also be used as an implementation module to construct higher-bit multiplication and modular multiplication for RSA2048, RSA4096, etc. RSA2048 and RSA4096 can be understood as two public key encryption algorithms.

An implementation of the present specification provides a computer data processing method, so as to implement 256-bit multiplication. Multipliers and multiplicands used for a 256-bit multiplication operation are separately split into four 64-bit numbers, and then an operation is performed on the split data based on a specific rule. The whole process can be implemented by using computer program code. In the operation process, only the registers inside the computer can be used, and it does not need to restrict which registers to use, nor need to access the cache space, thereby improving the data processing efficiency.

The computer data processing method in the present specification can be applied to a client or a server. The client can be an electronic device such as a smartphone, a tablet computer, an intelligent wearable device (a smartwatch, virtual reality glasses, virtual reality helmet, etc.), or an intelligent vehicle-mounted device.

FIG. 1 is a schematic flowchart illustrating a computer data processing method, according to an implementation of the present specification. As shown in FIG. 1, the computer data processing method provided in the implementation of the present specification can include the following steps:

Step 102: Separately split a multiplier a and a multiplicand b into four 64-bit numbers from most significant bits to least significant bits, to obtain split multipliers and split multiplicands, respectively, where the split multipliers include a[3], a[2], a[1], and a[0], and the split multiplicands include b[3], b[2], b[1], and b[0].

In a specific implementation process, the implementation of the present specification can be used to implement 256-bit multiplication, that is, to implement a big integer multiplication operation on two pieces of 256-bit data. Before data processing, the multiplier a and the multiplicand b in the 256-bit multiplication operation can be separately split into four 64-bit numbers, to obtain the split multipliers and the split multiplicands. Division can be performed once every 64 bits based on the number of bits of the data. For details, references can be made to FIG. 3. The split multipliers are divided into a[3], a[2], a[1], and a[0] per 64 bits from most significant bits to least significant bits. The split multiplicands are divided into b[3], b[2], b[1], and b[0] per 64 bits from most significant bits to least significant bits.

Step 104: Read the split multipliers and the split multiplicands into a register, and multiply the split multipliers and the split multiplicands based on a predetermined rule to obtain a multiplication processing result of target data, where the predetermined rule includes the following: the split multipliers and the split multiplicands are classified into seven groups of data pairs, a first group of data pairs includes a[0]b[0], a second group of data pairs includes a[1]b[0] and a[0]b[1], a third group of data pairs includes a[2]b[0], a[1]b[1], and a[0]b[2], a fourth group of data pairs includes a[3]b[0], a[2]b[1], a[1]b[2], and a[0]b[3], a fifth group of data pairs includes a[3]b[1], a[2]b[2], and a[1]b[3], a sixth group of data pairs includes a[3]b[2] and a[2]b[3], and a seventh group of data pairs includes a[3]b[3]; calculate multiplication results of the first group of data pairs to the seventh group of data pairs one by one, and perform intra-group accumulation on multiplication results of data pairs in each group, where the intra-group accumulation includes the following: in the same group of data pairs, a calculated multiplication result of each data pair is accumulated with a multiplication result of a previous data pair within the group, 64 least significant bits of a final accumulation result of each group of data pairs are stored in a memory, a remaining accumulation result of each group of data pairs is obtained, and a corresponding register is released; and accumulate a multiplication result of the first data pair in each group of data pairs with a remaining accumulation result of a previous group of data pairs, accumulate an accumulation result with a multiplication result of a next data pair until accumulation of multiplication results of the data pairs in the seventh group of data pairs is completed, and then store the accumulation result corresponding to the data pairs in the seventh group of data pairs in a memory to obtain the multiplication processing result of the target data.

In the specific implementation process, after splitting of the multiplier and the multiplicand is completed, the 256-bit multiplication can be calculated by invoking a 256-bit multiplication function, such as a 64-bit multiplication instruction and a 64-bit addition instruction. First, the split data can be read from the memory to a register. The split multipliers and the split multiplicands can occupy eight 64-bit registers. Then, the split multipliers and the split multiplicands are multiplied based on the predetermined rule to obtain the final target multiplication result, which can be stored in the memory. The specific predetermined rule for performing a multiplication operation can include the following:

FIG. 2 is a schematic diagram of grouping data pairs, according to an implementation of the present specification. As shown in FIG. 2, in an implementation of the present specification, arranged data can be grouped by columns based on a multiplication operation rule, that is, the multipliers and the multiplicands are bitwise multiplied and staggeredly arranged. The two pieces of data for the multiplication can be used as one data pair. As shown in FIG. 2, the split multipliers and the split multiplicands are classified into seven groups of data pairs. The dashed-line boxes from right to left in FIG. 2 represent the first group of data pairs to the seventh group of data pairs, respectively. As shown in FIG. 2, the first group of data pairs includes a[0]b[0], the second group of data pairs includes a[1]b[0] and a[0]b[1], the third group of data pairs includes a[2]b[0], a[1]b[1], and a[0]b[2], the fourth group of data pairs includes a[3]b[0], a[2]b[1], a[1]b[2], and a[0]b[3], the fifth group of data pairs includes a[3]b[1], a[2]b[2], and a[1]b[3], the sixth group of data pairs includes a[3]b[2] and a[2]b[3], and the seventh group of data pairs includes a[3]b[3]. In other words, the first group of data pairs includes one data pair: a[0] and b[0]; the second group of data pairs includes two data pairs: a[1] and b[0], a[0] and b[1]; and so on. Details are omitted here for simplicity.

It is worthwhile to note that, grouping the split data can be understood as predetermining a sequence of multiplication for all data pairs and a sequence of accumulating multiplication results, and does not necessarily mean that the data needs to be grouped first, and only indicates the data for which the multiplication results are accumulated. In the implementation of the present specification, for ease of description, the data can be grouped first, the multiplication results of the data pairs in the same group are accumulated, and then the most significant bits are accumulated with the multiplication result of the next group of data pairs.

After division of the data pairs, the multiplication results of the first group of data pairs to the seventh group of data pairs can be calculated one by one, and the multiplication results of data pairs in each group are accumulated on a per-group basis. If there is only one data pair in a group, a multiplication result of the data pair is used as an accumulation result of the group. For example, the multiplication result of the first group of data pairs is calculated, that is, a[0]×b[0] is first calculated to obtain a 128-bit multiplication result. The multiplication result can be stored in a register, and the multiplication result can occupy two 64-bit registers. The multiplication result can be used as the accumulation result of the first group of data pairs. The 64 least significant bits of the accumulation result can be used as the 64 least significant bits of the final target multiplication result. The multiplication result is stored from the register to the memory, and the register that stores the 64 least significant bits of the multiplication result is released. Then, the multiplication results of the second group of data pairs are calculated and accumulated; and then the multiplication results of the third group of data pairs are calculated and accumulated, and so on. Details are omitted here for simplicity.

It is worthwhile to note that, in the implementation of the present specification, during operation of the multiplication results and accumulation of data, after the multiplication result of each data pair is calculated, the calculated multiplication result is immediately accumulated with the multiplication result of the previous data pair. Then the multiplication result of the next data pair is calculated and accumulated. In addition, the 64 least significant bits of the final accumulation result of each group of data pairs can be stored from the corresponding register to the memory. The corresponding register is released and the remaining accumulation result of the group of data pairs is obtained. The multiplication result of the first data pair in each group of data pairs is accumulated with the remaining accumulation result of the previous group of data pairs. Then the multiplication result of the next data pair is calculated and accumulated with the obtained accumulation result until the seventh group of data pairs is calculated. The accumulation result of the seventh group of data pairs is stored in the memory to obtain the target multiplication result of two 256-bit numbers.

It is worthwhile to note that, each group of data pairs can include a plurality of data pairs. When a multiplication result of data pairs is calculated for each group of data pairs, a sequence of calculating each data pair can be selected depending on an actual need. The implementation of the present specification does not limit the sequence of calculating data pairs in each group of data pairs.

For example, the multiplication result of a[0] and b[0] in the first group of data pairs is first calculated to obtain the multiplication result of a[0] xb[0]. The 64 least significant bits of the calculated multiplication result is stored in the memory, and the corresponding register is released.

Then the multiplication result of the second group of data pairs is calculated, for example, the multiplication result of a[1]×b[0] can be calculated first, and the calculated multiplication result is accumulated with the 64 most significant bits of the multiplication result of a[0]×b[0] to obtain an accumulation result. Then the multiplication result of a[0]× b[1] is calculated, and the multiplication result of a[1]×b[0] is accumulated with the 64 most significant bits of the multiplication result of a[0] xb[0], and the obtained accumulation result is accumulated with the multiplication result of a[0] xb[1] to obtain the multiplication result of the second group of data pairs. The 64 least significant bits of the accumulation result of the second group of data pairs are stored in the memory to obtain the remaining accumulation result of the second group of data pairs, and the register that stores the accumulation result of the second group of data pairs is released.

Then the multiplication result of the third group of data pairs is calculated, for example, the multiplication result of a[2] xb[0] can be calculated first, and the multiplication result of a[2] xb[0] is accumulated with the remaining accumulation result of the second group of data pairs to obtain the accumulation result. Then, the multiplication result of a[1]b[1] and a[0]b[2] is calculated successively, and the calculated multiplication result is accumulated with the previous accumulation result. For details, references can be made to the calculation rule for the second group of data pairs. According to the similar method, the multiplication results and accumulation results of the fourth group of data pairs to the seventh group of data pairs are calculated successively. After the multiplication result of the seventh group of data pairs a[3] xb[3] is obtained, the multiplication result of a[3]×b[3] is accumulated with the remaining accumulation result of the sixth group of data pairs, the accumulation result is stored in the memory, and the corresponding register is released. The multiplication processing results of the final target data of 256-bit data a and b are stored in the memory, and the calculation ends. The target data can be understood as data a and b.

In some implementations of the present specification, when an operation is performed on each group of data pairs, the multiplication results of all data pairs are accumulated, the registers that originally store the multiplication results are released, and the accumulation result is stored in three registers, ensuring the minimum number of registers occupied in the whole calculation process.

The computer data processing method provided in some implementations of the present specification can be run in a 64-bit computer operating system, such as a 64-bit running environment of an ×86 central processing unit/processor (CPU). The 64-bit computer operating system can support 64-bit instructions, such as 64-bit multiplication and 64-bit addition, which are more powerful than 32-bit multiplication and addition in terms of computing capability, and the 64-bit ×86 CPU can provide more registers. A computer program for the computer data processing method in the implementations of the present specification can also be compiled by using 64 bits, and a 256-bit multiplication operation is performed by using a 64-bit operating system, which can provide more registers, so that in the data processing process, it is unnecessary to access the cache and the memory, thereby improving data processing efficiency, and quickly implementing 256-bit multiplication.

The ×86-64 CPU can typically include 16 64-bit registers in a 64-bit environment, such as RAX, RBX, RCX, RDX, RSI, RDI, RSP, RBP, R8, R9, R10, R11, R12, R13, R14, and R15. In some implementations of the present specification, four registers can be randomly selected from the following six registers of the 64-bit computer operating system: RBX, RBP, R12, R13, R14, and R15, and values of the selected registers are stored in the memory. After the target multiplication result is calculated, that is, after the 256-bit multiplication operation is completed, the stored values of the selected four registers are obtained from the memory to restore the values of the selected registers, thereby ensuring accurate running of a function and improving accuracy of data processing.

In the implementation of the present specification, the 256-bit multiplication method with ×86-64-bit characteristics and the implementation code are used as the basic module for big number calculation. The calculated multiplication processing result of the 256-bit data can be used to construct the elliptic curve cryptosystem and the big number calculation base of the MORSE platform (which can be understood as the digital currency platform) of the secure computing platform, laying a theoretical foundation for cryptography and big number operation.

In some implementations of the present specification, the following nine registers RAX, RCX, RDX, RSI, RDI, R8, R9, R10, and R11 can be selected from the 64-bit computer operating system. These nine registers and the four registers selected in the previous implementation are used for data storage in the 256-bit multiplication operation process. In the implementation of the present specification, except the RSP register, other 15 64-bit registers of the 16 64-bit registers of the x86-64 CPU in the 64-bit environment can be used for 256-bit multiplication calculation. In addition, in the implementation of the present specification, the nine registers RAX, RCX, RDX, RSI, RDI, R8, R9, R10, and R11 can be preferentially selected. After the calculation is completed, the values of the nine registers do not need to be restored, and only the four registers selected from the six registers RBX, RBP, R12, R13, R14, and R15 need to be restored. As such, data processing steps are reduced and data processing efficiency is improved.

According to the computer data processing method provided in the implementation of the present specification, a 256-bit multiplication operation is implemented, two pieces of 256-bit data are split into 64-bit data, and then the split data is calculated based on a predetermined rule. In the whole calculation process, multiplication results of all groups of data pairs are calculated one by one, and accumulated on a per-group basis. After accumulation of the multiplication results of all groups of data pairs is completed, 64 least significant bits of the accumulation result are stored in a memory, and a corresponding register is released. The accumulation is performed immediately upon multiplication. After a group of data pairs is accumulated, a register of 64 least significant bits is released immediately. Such operation mode occupies fewer registers so that only registers instead of caches and memories are accessed in the whole operation process, improving data processing efficiency and implementing quick operation of 256-bit multiplication.

FIG. 3 is a schematic flowchart illustrating a 256-bit multiplication operation, according to an implementation of the present specification. The following describes the data processing procedure in the implementation of the present specification with reference to FIG. 3.

1. Preparation of 256-Bit Multiplication Parameters

As shown in FIG. 3, two 256-bit multipliers are separately divided into four 64-bit numbers per 64 bits, which are stored in the memory. As shown in FIG. 3, bits can represent bits of data, 256 bits can represent 256 bits, and two 256-bit multipliers a and b are divided into a[3], a[2], a[1], a[0], b[3], b[2], b[1], and b[0] per 64 bits from most significant bits to least significant bits.

Steps 2, 3, and 4 can be understood as a process of executing a 256-bit multiplication function. The 256-bit multiplication function is invoked to start to calculate 256-bit multiplication.

2. Register Preparation

The x86-64 CPU can typically include 16 64-bit registers in a 64-bit environment, such as RAX, RBX, RCX, RDX, RSI, RDI, RSP, RBP, R8, R9, R10, R11, R12, R13, R14, and R15.

The calling convention of the 64-bit operating system (such as Windows, Unix/Linux, etc.) specifies the registers in a function whose values can be damaged, that is, can be directly used for calculation, and whose data does not need to be restored; the registers whose values need to be original values when being returned by the function; and the registers whose values cannot be damaged in the function. The values of the registers whose values need to be original values when being returned by the function are stored in the memory and can be used by the function later. The values of these registers need to be restored before being returned by the function. In the implementation of the present specification, 13 64-bit registers need to be prepared for the 256-bit multiplication operation.

For example, in the Linux 64-bit environment, the function can directly use the following nine registers: RAX, RCX, RDX, RSI, RDI, R8, R9, R10, and R11; the values of the following six registers need to be original values when being returned by the function: RBX, RBP, R12, R13, R14, and R15. The value of the register RSP is a stack top address. In the implementation of the present specification, the register RSP cannot be used in the function.

In the implementation of the present specification, four of the six registers RBX, RBP, R12, R13, R14, and R15 can be selected and stored in the memory. The 256-bit multiplication function can use 13 64-bit registers, namely, these four registers and RAX, RCX, RDX, RSI, RDI, R8, R9, R10, and R11.

3. Multiplication Calculation Process a[3], a[2], a[1], a[0], b[3], b[2], b[1], and b[0] can be read from the memory to the register, occupying eight 64-bit registers. In FIG. 3, "*" is the "×" in the implementation of the present specification, which can represent multiplication of two numbers.

3.1 Calculate a[0]×b[0] to obtain a 128-bit multiplication result. The 128-bit multiplication result is divided into two 64-bit numbers from most significant bits to least significant bits, which are stored in two 64-bit registers. The 64 least significant bits can be stored from the register to the memory as a part of the final multiplication result. In such case, one register is still occupied.

3.2 Calculate a[1]×b[0] to obtain a 128-bit multiplication result, which is stored in two 64-bit registers and is accumulated with 64 most significant bits of a[0]×b[0]. An accumulation result occupies three 64-bit registers. Calculate a[0]×b[1] to obtain a 128-bit multiplication result, which is stored in two 64-bit registers and is accumulated with an existing accumulation result. An obtained accumulation result occupies three 64-bit registers. The 64 least significant bits of the accumulation result can be stored from the register to the memory as a part of the final multiplication result. In such case, the accumulation result still occupies two registers.

3.3 Calculate a[2]×b[0] to obtain a 128-bit multiplication result, which is stored in two 64-bit registers and is accumulated with an existing accumulation result. An obtained accumulation result occupies three 64-bit registers. Calculate a[1]×b[1] to obtain a 128-bit multiplication result, which is stored in two 64-bit registers and is accumulated with an existing accumulation result. An obtained accumulation result occupies three 64-bit registers. Calculate a[0]×b[2] to obtain a 128-bit multiplication result, which is stored in two 64-bit registers and is accumulated with an existing accumulation result. An obtained accumulation result occupies three 64-bit registers. The 64 least significant bits of the accumulation result can be stored from the register to the memory as a part of the final multiplication result. In such case, the accumulation result still occupies two registers.

3.4 Calculate a[3]×b[0] to obtain a 128-bit multiplication result, which is stored in two 64-bit registers and is accumulated with an existing accumulation result. An obtained accumulation result occupies three 64-bit registers. Calculate a[2]×b[1] to obtain a 128-bit multiplication result, which is stored in two 64-bit registers and is accumulated with an existing accumulation result. An obtained accumulation result occupies three 64-bit registers. Calculate a[1]×b[2] to obtain a 128-bit multiplication result, which is stored in two 64-bit registers and is accumulated with an existing accumulation result. An obtained accumulation result occupies three 64-bit registers. Calculate a[0]×b[3] to obtain a 128-bit multiplication result, which is stored in two 64-bit registers and is accumulated with an existing accumulation result. An obtained accumulation result occupies three 64-bit registers. The 64 least significant bits of the accumulation result can be stored from the register to the memory as a part of the final multiplication result. In such case, the accumulation result still occupies two registers.

3.5 Calculate a[3]×b[1] to obtain a 128-bit multiplication result, which is stored in two 64-bit registers and is accumulated with an existing accumulation result. An obtained accumulation result occupies three 64-bit registers. Calculate a[2]×b[2] to obtain a 128-bit multiplication result, which is stored in two 64-bit registers and is accumulated with an existing accumulation result. An obtained accumulation result occupies three 64-bit registers. Calculate a[1]×b[3] to obtain a 128-bit multiplication result, which is stored in two 64-bit registers and is accumulated with an existing accumulation result. An obtained accumulation result occupies three 64-bit registers. The 64 least significant bits of the accumulation result can be stored from the register to the memory as a part of the final multiplication result. In such case, the accumulation result still occupies two registers.

3.6 Calculate a[3]×b[2] to obtain a 128-bit multiplication result, which is stored in two 64-bit registers and is accumulated with an existing accumulation result. An obtained accumulation result occupies three 64-bit registers. Calculate a[2]×b[3] to obtain a 128-bit multiplication result, which is stored in two 64-bit registers and is accumulated with an existing accumulation result. An obtained accumulation result occupies three 64-bit registers. The 64 least significant bits of the accumulation result can be stored from the register to the memory as a part of the final multiplication result. In such case, the accumulation result still occupies two registers.

It is worthwhile to note that, in steps 3.2 to 3.6, the sequence of calculating the multiplication result of two pieces of data can be adjusted depending on an actual need, which is not limited in the implementation of the present specification.

3.7 Calculate a[3]×b[3] to obtain a 128-bit multiplication result, which is stored in two 64-bit registers and is accumulated with an existing accumulation result. An obtained accumulation result occupies two 64-bit registers. The obtained 128-bit accumulation result is the final result, and is stored from the register to the memory and no longer occupies the register.

For the calculation process from step 3.1 to step 3.7, references can be made to FIG. 3. Each step can correspond to the calculation of one group of data pairs in the previous implementations. For the division of each group of data pairs, references can be made to FIG. 2 and FIG. 3. As shown in FIG. 3, the product of the next group of data can be added to the most significant bits of the accumulation result of the previous group of data.

It can be seen that, the multipliers a and b occupy eight 64-bit registers, and other 64-bit registers occupied in the multiplication calculation are as follows: Step 3.1 occupies two 64-bit registers; steps 3.2, 3.3, 3.4, 3.5, and 3.6 occupy five 64-bit registers; and step 3.7 occupies three 64-bit registers.

In summary, in the whole multiplication calculation process, two multipliers a and b need eight 64-bit spaces, and multiplication and addition of data need a maximum of five 64-bit temporary spaces. Therefore, the whole multiplication calculation process can be completed in 13 64-bit registers.

4. Register Restoration

For the four registers whose values are stored in the memory in step 2 of register preparation, after the calculation is completed, the values can be read from the memory to restore the values of these four registers.

The 256-bit multiplication function returns after steps 2, 3, and 4 are performed. In FIG. 3, s[0]-s[7] represent the accumulation results, where s[0] can represent the 64 least significant bits of the multiplication result of the first group of data pairs, that is, a[0]×b[0]; s[1] can represent the 64 least significant bits of the accumulation result of the second group of data pairs; by analogy, s[6] and s[7] can represent the accumulation result of the multiplication result of the seventh group of data pairs and the remaining accumulation result of the sixth group of data pairs.

The 256-bit multiplication calculation process in the implementation of the present specification can be implemented by using a 64-bit instruction and a 64-bit register of the x86 CPU. The 64-bit instruction supported by the 64-bit environment of the x86 CPU can be the following 64-bit instruction:

(1) 64-bit multiplication instruction MUL; or the MULX launched from the 2013 Haswell architecture of the Intel CPU. In addition, the register used by the multiplication result can be specified, for example, five registers are specified as the registers used by the multiplication result, so as to reduce mov instructions (data transfer instructions) and improve data processing efficiency.

(2) 64-bit addition instruction ADD or carrying addition instruction ADC.

The 64-bit environment of the x86 CPU typically includes 16 64-bit registers: RAX, RBX, RCX, RDX, RSI, RDI, RSP, RBP, R8, R9, R10, R11, R12, R13, R14, and R15.

The register RSP is used for a stack pointer, assembling the compiled code, and storing the corresponding register in the stack for protection. The register is restored before the program returns. In such case, the register can be used for calculation. In the 64-bit environment of the x86 CPU, except the register RSP, the other 15 64-bit registers can be used for calculation.

The 256-bit multiplication calculation process in the implementations of the present specification needs 13 64-bit spaces, that is, 13 64-bit registers, and the 64-bit environment of the x86 CPU can provide 15 64-bit registers for data processing. Therefore, according to the computer data processing method provided in the implementations of the present specification, calculation can be completed in the registers in the 64-bit environment of the x86 CPU, and the remaining two registers can be used as standby registers.

According to the computer data processing method provided in the implementations of the present specification, a 256-bit multiplication operation is implemented, and can be completed in the 64-bit environment of the x86 CPU. It occupies fewer registers, and does not limit (or specify) which 64-bit registers are to be used, which 64-bit multiplication and addition instructions are to be used, and specific code implementation. In the whole calculation process, the cache and the memory can not be accessed, thereby improving data processing efficiency, implementing 256-bit quick multiplication operation, and laying a data foundation for cryptography, big integer operation, etc.

The implementations of the previous methods in the present specification are described in a progressive way. For same or similar parts of the implementations, references can be made to the implementations mutually. Each implementation focuses on a difference from other implementations. For related parts, references can be made to related descriptions in the method implementations.

Based on the previous computer data processing method, one or more implementations of the present specification further provide a computer data processing apparatus. The apparatus can include a system (including a distributed system), software (an application), a module, a component, a server, a client, etc. that uses the method described in the implementations of the present specification, as well as an apparatus that combines necessary implementation hardware. Based on the same innovative concept, the apparatus provided in one or more implementations of the present specification is described in the following implementation. Because a problem-solving implementation solution of the apparatus is similar to that of the method, for specific implementation of the apparatus in the implementations of the present specification, references can be made to the implementations of the previous method, and repeated parts are omitted for simplicity. The term "unit" or "module" used in the following can implement a combination of software and/or hardware that performs predetermined functions. Although the apparatuses described in the following implementations are preferably implemented in software, implementation of hardware, or a combination of software and hardware, is possible and conceived.

Figure 4:
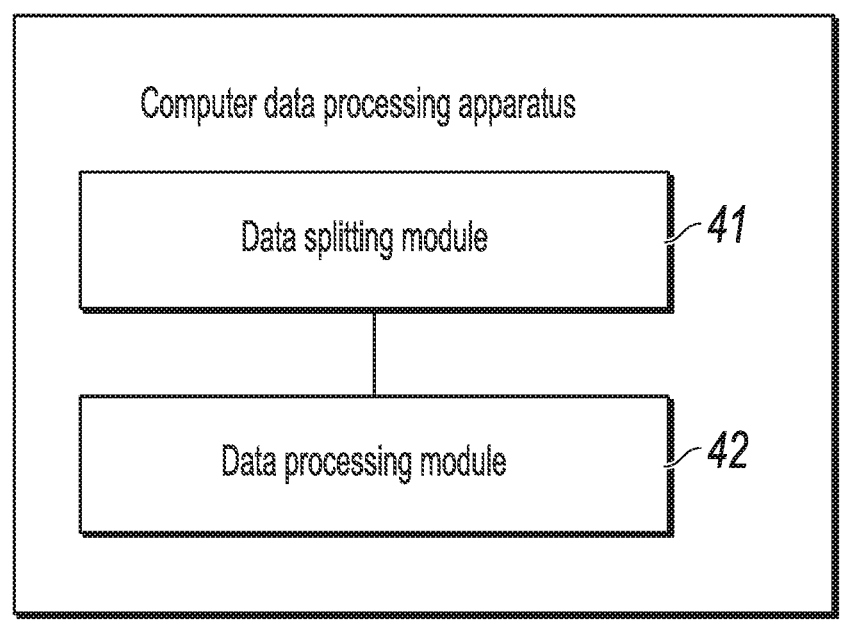
FIG. 4 is a schematic structural diagram illustrating a module of an implementation of a computer data processing apparatus, according to the present specification.

FIG. 4 is a schematic structural diagram illustrating a module of an implementation of a computer data processing apparatus, according to the present specification. As shown in FIG. 4, the computer data processing apparatus provided in the present specification is configured to implement multiplication data processing of two 256-bit numbers. The apparatus can include a data splitting module 41 and a data processing module 42.

The data splitting module 41 can be configured to separately split a multiplier a and a multiplicand b into four 64-bit numbers from most significant bits to least significant bits, to obtain split multipliers and split multiplicands, respectively, where the split multipliers include a[3], a[2], a[1], and a[0], and the split multiplicands include b[3], b[2], b[1], and b[0].

The data processing module 42 can be configured to: read the split multipliers and the split multiplicands into a register, and multiply the split multipliers and the split multiplicands based on a predetermined rule to obtain a multiplication processing result of target data, where the predetermined rule includes the following: the split multipliers and the split multiplicands are classified into seven groups of data pairs, a first group of data pairs includes a[0]b[0], a second group of data pairs includes a[1]b[0] and a[0]b[1], a third group of data pairs includes a[2]b[0], a[1]b[1], and a[0]b[2], a fourth group of data pairs includes a[3]b[0], a[2]b[1], a[1]b[2], and a[0]b[3], a fifth group of data pairs includes a[3]b[1], a[2]b[2], and a[1]b[3], a sixth group of data pairs includes a[3]b[2] and a[2]b[3], and a seventh group of data pairs includes a[3]b[3]; calculate multiplication results of the first group of data pairs to the seventh group of data pairs one by one, and perform intra-group accumulation on multiplication results of data pairs in each group, where the intra-group accumulation includes the following: in the same group of data pairs, a calculated multiplication result of each data pair is accumulated with a multiplication result of a previous data pair within the group, 64 least significant bits of a final accumulation result of the data pairs in the same group are stored in a memory, a remaining accumulation result of the corresponding group of data pairs is obtained, and a corresponding register is released; and accumulate a multiplication result of the first data pair in each group of data pairs with a remaining accumulation result of a previous group of data pairs, accumulate an accumulation result with a multiplication result of a next data pair until accumulation of multiplication results of the data pairs in the seventh group of data pairs is completed, and then store the accumulation result corresponding to the data pairs in the seventh group of data pairs in a memory to obtain the multiplication processing result of the target data.

According to the computer data processing apparatus provided in the implementation of the present specification, a 256-bit multiplication operation is implemented, two pieces of 256-bit data are split into 64-bit data, and then the split data is calculated based on a predetermined rule. In the whole calculation process, multiplication results of all groups of data pairs are calculated one by one, and accumulated on a per-group basis. After accumulation of the multiplication results of all groups of data pairs is completed, 64 least significant bits of the accumulation result are stored in a memory, and a corresponding register is released. The accumulation is performed immediately upon multiplication. After a group of data pairs is accumulated, a register of 64 least significant bits is released immediately. Such operation mode occupies fewer registers so that only registers instead of caches and memories are accessed in the whole operation process, improving data processing efficiency and implementing quick operation of 256-bit multiplication.

On the basis of the previous implementations, in some implementations of the present specification, the data processing module is configured to: release a register that stores the multiplication result of each data pair when accumulating the multiplication results of each group of data pairs, and store an accumulation result in three registers.

In the implementation of the present specification, the accumulation is performed immediately upon multiplication. After a group of data pairs is accumulated, a register of 64 least significant bits is released immediately. Such operation mode ensures that the whole calculation process occupies the minimum number of registers.

On the basis of the previous implementations, in some implementations of the present specification, the apparatus is applied to a 64-bit computer operating system.

In the implementation of the present specification, a 256-bit multiplication operation is performed by using a 64-bit operating system, which can provide more registers, so that in the data processing process, it is unnecessary to access the cache and the memory, thereby improving data processing efficiency, and quickly implementing 256-bit multiplication.

Figure 5:
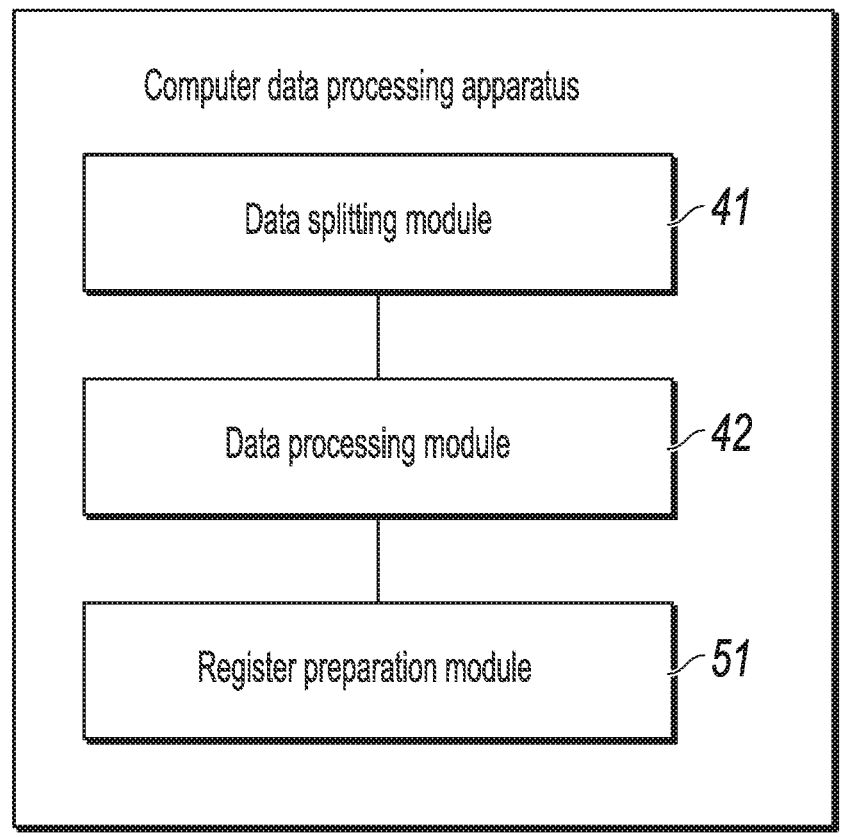
FIG. 5 is a schematic structural diagram illustrating a computer data processing apparatus, according to another implementation of the present specification.

FIG. 5 is a schematic structural diagram illustrating a computer data processing apparatus, according to another implementation of the present specification. As shown in FIG. 5, on the basis of the previous implementations, in some implementations of the present specification, the apparatus further includes a register preparation module 51, configured to: randomly select four registers from registers RBX, RBP, R12, R13, R14, and R15 of the 64-bit computer operating system, and store values of the selected registers in the memory; and obtain the stored values of the selected registers from the memory after the target multiplication result is calculated, and restore the values of the selected registers.

In the implementation of the present specification, after the target multiplication result is calculated, that is, after the 256-bit multiplication operation is completed, the stored values of the selected four registers are obtained from the memory to restore the values of the selected registers, thereby ensuring accurate running of a function and improving accuracy of data processing.

On the basis of the previous implementations, in some implementations of the present specification, the register preparation module is further configured to: select registers RAX, RCX, RDX, RSI, RDI, R8, R9, R10, and R11 from the 64-bit computer operating system, where the selected registers are all used for data storage in a data processing procedure.

In the implementation of the present specification, the nine registers RAX, RCX, RDX, RSI, RDI, R8, R9, R10, and R11 can be preferentially selected. After the calculation is completed, the values of the nine registers do not need to be restored, and only the four registers selected from the six registers RBX, RBP, R12, R13, R14, and R15 need to be restored. As such, data processing steps are reduced and data processing efficiency is improved.

It is worthwhile to note that, the previous apparatus can further include other implementations based on the description of the method implementation. For a specific implementation, references can be made to the description of the previous corresponding method implementation, and details are omitted here for simplicity.

An implementation of the present specification further provides a computer data processing device, including the following: at least one 64-bit processor, a memory for storing a processor-executable 64-bit instruction, and at least 13 64-bit registers, where the processor executes the 64-bit instruction to implement the computer data processing method in the previous implementation, for example, splitting a multiplier a and a multiplicand b into four 64-bit numbers from most significant bits to least significant bits, to obtain split multipliers and split multiplicands, respectively, where the split multipliers include a[3], a[2], a[1], and a[0], and the split multiplicands include b[3], b[2], b[1], and b[0]; reading the split multipliers and the split multiplicands into a register, and multiplying the split multipliers and the split multiplicands based on a predetermined rule to obtain a target multiplication result, where the predetermined rule includes the following: the split multipliers and the split multiplicands are classified into seven groups of data pairs, a first group of data pairs includes a[0]b[0], a second group of data pairs includes a[1]b[0] and a[0]b[1], a third group of data pairs includes a[2]b[0], a[1]b[1], and a[0]b[2], a fourth group of data pairs includes a[3]b[0], a[2]b[1], a[1]b[2], and a[0]b[3], a fifth group of data pairs includes a[3]b[1], a[2]b[2], and a[1]b[3], a sixth group of data pairs includes a[3]b[2] and a[2]b[3], and a seventh group of data pairs includes a[3]b[3]; calculating the multiplication result of the first group of data pairs, storing the 64 least significant bits of the obtained multiplication result of the first group of data pairs in the memory, and releasing the corresponding register; and calculating multiplication results of the second group of data pairs to the seventh group of data pairs one by one, and accumulating multiplication results of data pairs on a per-group basis, where a calculated multiplication result of each data pair is accumulated with a multiplication result of a previous data pair, 64 least significant bits of a final accumulation result of each group of data pairs are stored in a memory, a remaining accumulation result of each group of data pairs is obtained, and a corresponding register is released.

A multiplication result of the first data pair in each group of data pairs is accumulated with a remaining accumulation result of a previous group of data pairs. An accumulation result is accumulated with a multiplication result of a next data pair until accumulation of multiplication results of the data pairs in the seventh group of data pairs is completed. Then the accumulation result corresponding to the data pairs in the seventh group of data pairs is stored in the memory to obtain the target multiplication result.

It is worthwhile to note that, the previous processing device can further include other implementations based on the description of the method implementation. For a specific implementation, references can be made to the description of the related method implementation, and details are omitted here for simplicity.

The computer data processing apparatus or processing device provided in the present specification can also be applied to a plurality of data analysis and processing systems. The system or apparatus or processing device can include any one of the computer data processing apparatuses in the previous implementations. The system or apparatus or processing device can be a standalone server, or can include a server cluster, a system (including a distributed system), software (an application), an actual operating apparatus, a logic gate circuit apparatus, a quantum computer, etc. that uses one or more methods or one or more implementation apparatuses in the present specification, as well as an end-user device that combines necessary implementation hardware. The detection system for verifying differential data can include at least one processor and a memory for storing a computer executable instruction, where the processor executes the instruction to implement the steps of the method in any one or more of the previous implementations.

Figure 6:
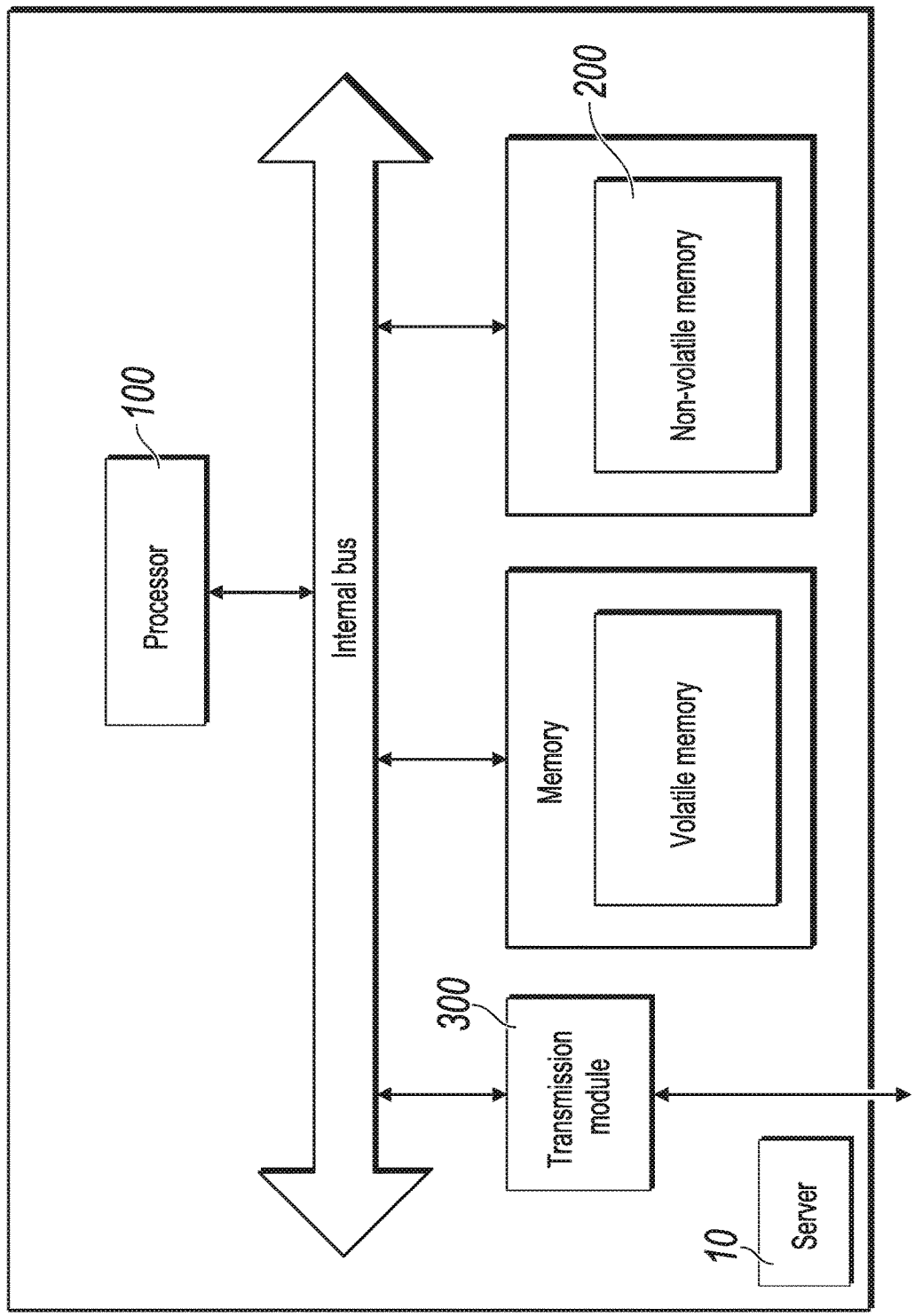
FIG. 6 is a block diagram illustrating a hardware structure of a computer data processing server, according to an implementation of the present specification.

The method implementations provided in the implementations of the present specification can be executed in a mobile device, a computer device, a server, or a similar operation apparatus. For example, the method implementations are executed on the server. FIG. 6 is a block diagram illustrating a hardware structure of a computer data processing server, according to an implementation of the present specification. The server can be the computer data processing apparatus or the computer data processing device in the previous implementations. As shown in FIG. 6, the server 10 can include one or more (only one is shown in the figure) processors 100 (the processor 100 can include but is not limited to a processing apparatus such as a microprocessor MCU or a programmable logic device FPGA), a memory 200 for storing data, and a transmission module 300 for communication. A person of ordinary skill in the art can understand that the structure shown in FIG. 6 is merely an example, and does not limit the structure of the previous electronic device. For example, the server 10 can further include more or fewer components than those shown in FIG. 6, for example, can further include other processing hardware such as a database, a plurality of levels of caches, and a GPU, or can have a configuration different from that shown in FIG. 6.

The memory 200 can be configured to store software programs and modules of application software, such as program instructions/modules corresponding to computer data processing methods in the implementations of the present specification. The processor 100 executes various functional applications and data processing by running the software programs and modules stored in the memory 200. The memory 200 can include a high-speed random access memory, and can further include non-volatile memories, such as one or more magnetic storage devices, flash memories, or other non-volatile solid-state memories. In some instances, the memory 200 can further include memories that are disposed remotely relative to the processor 100, and these remote memories can be connected to a computer device through a network. Instances of the previous network include but are not limited to the Internet, an intranet, a local area network, a mobile communications network, and a combination thereof.

The transmission module 300 is configured to receive or send data over a network. Specific instances of the previous network can include a wireless network provided by a communication vendor of the computer device. In an instance, the transmission module 300 includes a network interface controller (NIC) that can be connected to other network devices by using a base station to communicate with the Internet. In an instance, the transmission module 300 can be a radio frequency (RF) module that is configured to communicate wirelessly with the Internet.

Specific implementations of the present specification are described above. Other implementations are within the scope of the appended claims. In some cases, the actions or steps described in the claims can be performed in different order than in the implementations and can still achieve the desired results. In addition, the process depicted in the accompanying drawings does not necessarily need a particular execution order to achieve the desired results. In some implementations, multi-tasking and concurrent processing is feasible or can be advantageous.

The method or apparatus provided in the previous implementations of the present specification can implement business logic by using a computer program and record the business logic on a storage medium. The storage medium can be read and executed by a computer to achieve the effects of the solutions described in the implementations of the present specification.

The storage medium can include a physical device for storing information. Usually, the information is digitized and then stored by using a medium such as electricity, magnetism, or optics. The storage medium can include the following: a device for storing information by using electrical energy, for example, various types of memories such as RAM and ROM; a device for storing information by using magnetic energy, for example, a hard disk, a floppy disk, a magnetic tape, a magnetic core memory, a magnetic bubble memory, and a USB flash drive; and a device for storing information by using optics, for example, a CD or a DVD. Certainly, there are other forms of readable storage media, for example, a quantum memory, a graphene memory, etc.

The previous computer data processing method or apparatus provided in the implementations of the present specification can be implemented in a computer by a processor executing a corresponding program instruction, for example, be implemented in a PC by using the c++ language of the Windows operating system, be implemented by using a Linux system, be implemented in an intelligent device by using the Android or iOS system programming language, and be implemented based on processing logic of a quantum computer.

It is worthwhile to note that, based on the descriptions of the related method implementations, the previous apparatus, computer storage medium, and system in the present specification can further include other implementations. For a specific implementation, references can be made to the description of the corresponding method implementation, and details are omitted here for simplicity.

The implementations in the present specification are described in a progressive way. For same or similar parts of the implementations, references can be made to the implementations mutually. Each implementation focuses on a difference from other implementations. Particularly, a hardware plus program implementation is similar to a method implementation, and therefore is described briefly. For related parts, references can be made to related descriptions in the method implementation.

The implementations of the present specification are not limited to be compliant with industry communications standards, standard computer data processing and data storage rules, or situations described in one or more implementations of the present specification. The same, equivalent or similar, or foreseeable variant implementation effects of the previous implementations can also be achieved by some industry standards or implementation solutions slightly modified by using a customization method or based on the previous implementations. The implementations obtained by using these modified or variant data acquisition, storage, determining, and processing methods can still fall within the scope of the optional implementation solutions in the implementations of the present specification.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The system, apparatus, module, or unit illustrated in the previous implementations can be implemented by using a computer chip or an entity, or can be implemented by using a product having a certain function. A typical implementation device is a computer. The computer can be, for example, a personal computer, a laptop computer, an vehicle-mounted human-computer interaction device, a cellular phone, a camera phone, a smart phone, a personal digital assistant, a media player, a navigation device, an e-mail device, a game console, a tablet computer, a wearable device, or a combination of any of these devices.

Although one or more implementations of the present specification provide the method operation steps described in the implementations or flowcharts, more or fewer operation steps can be included based on a conventional or non-inventive method. The sequence of steps enumerated in the implementations is only one of a number of step execution sequences and does not represent a unique execution sequence. In practice, apparatus or device products can be executed sequentially or concurrently based on the methods shown in the implementations or accompanying drawings (e.g., a parallel processor or multithreading environment, or even a distributed data processing environment). The terms "include", "comprise", or any other variant is intended to cover a non-exclusive inclusion, so that a process, a method, a product, or a device that includes a list of elements not only includes those elements but also includes other elements that are not expressly listed, or further includes elements inherent to such a process, method, product, or device. Without more constraints, the existence of additional identical or equivalent elements in the process, method, product or device that includes the element is not precluded. Words such as first and second are used to represent names rather than any particular order.

For ease of description, the apparatus above is described by dividing functions into various modules. Certainly, when one or more implementations of the present specification are implemented, a function of each module can be implemented in one or more pieces of software and/or hardware, or a module that implements the same function can be implemented by a combination of a plurality of submodules or subunits. The above described apparatus implementation is merely an example. For example, the unit division is merely logical function division and can be other division in actual implementation. For example, a plurality of units or components can be combined or integrated into another system, or some features can be ignored or not performed. In addition, the displayed or discussed mutual couplings or direct couplings or communication connections can be implemented through some interfaces. The indirect couplings or communication connections between the apparatuses or units can be implemented in electronic, mechanical, or other forms.

The present disclosure is described with reference to the flowcharts and/or block diagrams of the method, the apparatus (system), and the computer program product according to the implementations of the present invention. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so the instructions executed by the computer or the processor of the another programmable data processing device generate a device for implementing a specific function in one or more processes in the flowcharts and/or in one or more blocks in the block diagrams.

These computer program instructions can be stored in a computer readable memory that can instruct the computer or the another programmable data processing device to work in a specific way, so the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto the computer or another programmable data processing device, so a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPU), input/output interfaces, network interfaces, and memories.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD), or another optical storage, a cassette tape, a cassette magnetic disk storage, a graphene storage, or another magnetic storage device or any other non-transmission medium. The computer storage medium can be configured to store information that can be accessed by a computing device. Based on the definition in the present specification, the computer readable medium does not include transitory media such as a modulated data signal and carrier.

A person skilled in the art should understand that one or more implementations of the present specification can be provided as a method, a system, or a computer program product. Therefore, one or more implementations of the present specification can use a form of hardware only implementations, software only implementations, or implementations with a combination of software and hardware. Moreover, one or more implementations of the present specification can use a form of a computer program product that is implemented on one or more computer-usable storage media (including but not limited to a disk memory, a CD-ROM, an optical memory, etc.) that include computer-usable program code.

One or more implementations of the present specification can be described in the general context of computer-executable instructions, for example, a program module. Generally, the program module includes a routine, a program, an object, a component, a data structure, etc. executing a specific task or implementing a specific abstract data type. One or more implementations of the present specification can alternatively be practiced in distributed computing environments in which tasks are performed by remote processing devices that are connected through a communications network. In a distributed computing environment, the program module can be located in both local and remote computer storage media including storage devices.

The implementations in the present specification are described in a progressive way. For same or similar parts of the implementations, references can be made to the implementations mutually. Each implementation focuses on a difference from other implementations. Particularly, a system implementation is similar to a method implementation, and therefore is described briefly. For related parts, references can be made to related descriptions in the method implementation. In the description of the present specification, reference to the terms "one implementation", "some implementations", "examples", "specific examples", "some examples", and the like means that specific features, structures, materials, or characteristics described in connection with the implementation or example are included in at least one implementation or example of the present specification. In the present specification, exemplary expressions of the previous terms do not necessarily refer to the same implementations or examples. Moreover, the described specific features, structures, materials, or characteristics can be combined in an appropriate way in any one or more implementations or examples. In addition, a person skilled in the art can integrate and combine different implementations or examples and characteristics of different implementations or examples described in the present specification if they are not mutually exclusive.

The previous descriptions are merely one or more implementations of the present specification, and are not intended to limit the one or more implementations of the present specification. For a person skilled in the art, the one or more implementations of the present specification can have various modifications and changes. Any modification, equivalent replacement, or improvement made without departing from the spirit and principle of the present specification shall fall within the scope of the claims.

What is claimed is:

1. A computer-implemented method comprising:
   splitting, by a computing device, a multiplier into four 64-bit numbers from most significant bits to least significant bits to obtain split multipliers, the split multipliers comprising a[3], a[2], a[1], and a[0];
   splitting, by the computing device, a multiplicand into four 64-bit numbers from most significant bits to least significant bits to obtain split multiplicands, the split multiplicands comprising b[3], b[2], b[1], and b[0];
   reading, by the computing device, the split multipliers and the split multiplicands into a register; and
   obtaining, by the computing device, a multiplication processing result for the multiplier and the multiplicand by performing operations comprising:
      classifying the split multipliers and the split multiplicands into seven groups of data pairs, wherein a first group of data pairs comprises a[0]b[0], a second group of data pairs comprises a[1]b[0] and a[0]b[1], a third group of data pairs comprises a[2]b[0], a[1]b[1], and a[0]b[2], a fourth group of data pairs comprises a[3]b[0], a[2]b[1], a[1]b[2], and a[0]b[3], a fifth group of data pairs comprises a[3]b[1], a[2]b[2], and a[1]b[3], a sixth group of data pairs comprises a[3]b[2] and a[2]b[3], and a seventh group of data pairs comprises a[3]b[3];
      calculating multiplication results of the first group of data pairs to the seventh group of data pairs one by one, and performing intra-group accumulation on multiplication results of data pairs in each group, the intra-group accumulation comprising: (i) in a same group of data pairs, accumulating a calculated multiplication result for each data pair with a multiplication result of a previous data pair, (ii) storing in memory, 64 least significant bits of a final accumulation result for data pairs in the same group of data pairs, (iii) obtaining a remaining accumulation result of the same group of data pairs, and (iv) releasing a corresponding register; and
      accumulating a multiplication result of a first data pair in each group of data pairs with the remaining accumulation result of a previous group of data pairs, accumulating an accumulation result with a multiplication result of a next data pair until accumulation of multiplication results of the data pairs in the seventh group of data pairs is completed, and storing the accumulation result corresponding to the data pairs in the seventh group of data pairs in memory as the multiplication processing result for the multiplier and the multiplicand.

2. The computer-implemented method according to claim 1, wherein the multiplier and the multiplicand are each 256-bit numbers.

3. The computer-implemented method according to claim 1, further comprising:
   releasing a register that stores the multiplication result of each data pair when accumulating the multiplication results of each group of data pairs, and storing the accumulation result in three registers.

4. The computer-implemented method according to claim 1, wherein the computing device uses a 64-bit computer operating system.

5. The computer-implemented method according to claim 4, further comprising:
  randomly selecting four registers from registers RBX, RBP, R12, R13, R14, and R15 of the 64-bit computer operating system, and storing values of the selected registers in memory; and
  obtaining the stored values of the selected registers from memory after the multiplication processing result for the multiplier and the multiplicand is obtained, and restoring the values of the selected registers.

6. The computer-implemented method according to claim 5, further comprising:
  selecting registers RAX, RCX, RDX, RSI, RDI, R8, R9, R10, and R11 from the 64-bit computer operating system, wherein the selected registers are all used for data storage in a data processing procedure.

7. A computer-implemented system, comprising:
  one or more computers; and
  one or more computer memory devices interoperably coupled with the one or more computers and having tangible, non-transitory, machine-readable media storing one or more instructions that, when executed by the one or more computers, perform operations comprising:
    splitting, by a computing device, a multiplier into four 64-bit numbers from most significant bits to least significant bits to obtain split multipliers, the split multipliers comprising a[3], a[2], a[1], and a[0];
    splitting, by the computing device, a multiplicand into four 64-bit numbers from most significant bits to least significant bits to obtain split multiplicands, the split multiplicands comprising b[3], b[2], b[1], and b[0];
    reading, by the computing device, the split multipliers and the split multiplicands into a register; and
    obtaining, by the computing device, a multiplication processing result for the multiplier and the multiplicand by performing operations comprising:
      classifying the split multipliers and the split multiplicands into seven groups of data pairs, wherein a first group of data pairs comprises a[0]b[0], a second group of data pairs comprises a[1]b[0] and a[0]b[1], a third group of data pairs comprises a[2]b[0], a[1]b[1], and a[0]b[2], a fourth group of data pairs comprises a[3]b[0], a[2]b[1], a[1]b[2], and a[0]b[3], a fifth group of data pairs comprises a[3]b[1], a[2]b[2], and a[1]b[3], a sixth group of data pairs comprises a[3]b[2] and a[2]b[3], and a seventh group of data pairs comprises a[3]b[3];
      calculating multiplication results of the first group of data pairs to the seventh group of data pairs one by one, and performing intra-group accumulation on multiplication results of data pairs in each group, the intra-group accumulation comprising: (i) in a same group of data pairs, accumulating a calculated multiplication result for each data pair with a multiplication result of a previous data pair, (ii) storing in memory, 64 least significant bits of a final accumulation result for data pairs in the same group of data pairs, (iii) obtaining a remaining accumulation result of the same group of data pairs, and (iv) releasing a corresponding register; and
      accumulating a multiplication result of a first data pair in each group of data pairs with the remaining accumulation result of a previous group of data pairs, accumulating an accumulation result with a multiplication result of a next data pair until accumulation of multiplication results of the data pairs in the seventh group of data pairs is completed, and storing the accumulation result corresponding to the data pairs in the seventh group of data pairs in memory as the multiplication processing result for the multiplier and the multiplicand.

8. The computer-implemented system according to claim 7, wherein the multiplier and the multiplicand are each 256-bit numbers.

9. The computer-implemented system according to claim 7, the operations further comprising:
  releasing a register that stores the multiplication result of each data pair when accumulating the multiplication results of each group of data pairs, and storing the accumulation result in three registers.

10. The computer-implemented system according to claim 7, wherein the computing device uses a 64-bit computer operating system.

11. The computer-implemented system according to claim 10, the operations further comprising:
  randomly selecting four registers from registers RBX, RBP, R12, R13, R14, and R15 of the 64-bit computer operating system, and storing values of the selected registers in memory; and
  obtaining the stored values of the selected registers from memory after the multiplication processing result for the multiplier and the multiplicand is obtained, and restoring the values of the selected registers.

12. The computer-implemented system according to claim 11, the operations further comprising:
  selecting registers RAX, RCX, RDX, RSI, RDI, R8, R9, R10, and R11 from the 64-bit computer operating system, wherein the selected registers are all used for data storage in a data processing procedure.

13. A non-transitory, computer-readable medium storing one or more instructions executable by a computer system to perform operations comprising:
  splitting, by a computing device, a multiplier into four 64-bit numbers from most significant bits to least significant bits to obtain split multipliers, the split multipliers comprising a[3], a[2], a[1], and a[0];
  splitting, by the computing device, a multiplicand into four 64-bit numbers from most significant bits to least significant bits to obtain split multiplicands, the split multiplicands comprising b[3], b[2], b[1], and b[0];
  reading, by the computing device, the split multipliers and the split multiplicands into a register; and
  obtaining, by the computing device, a multiplication processing result for the multiplier and the multiplicand by performing operations comprising:
    classifying the split multipliers and the split multiplicands into seven groups of data pairs, wherein a first group of data pairs comprises a[0]b[0], a second group of data pairs comprises a[1]b[0] and a[0]b[1], a third group of data pairs comprises a[2]b[0], a[1]b[1], and a[0]b[2], a fourth group of data pairs comprises a[3]b[0], a[2]b[1], a[1]b[2], and a[0]b[3], a fifth group of data pairs comprises a[3]b[1], a[2]b[2], and a[1]b[3], a sixth group of data pairs comprises a[3]b[2] and a[2]b[3], and a seventh group of data pairs comprises a[3]b[3];
    calculating multiplication results of the first group of data pairs to the seventh group of data pairs one by one, and performing intra-group accumulation on multiplication results of data pairs in each group, the intra-group accumulation comprising: (i) in a same group of data pairs, accumulating a calculated multiplication result for each data pair with a multiplication result of a previous data pair, (ii) storing in memory, 64 least significant bits of a final accumulation result for data pairs in the same group of data pairs, (iii) obtaining a remaining accumulation result of the same group of data pairs, and (iv) releasing a corresponding register; and accumulating a multiplication result of a first data pair in each group of data pairs with the remaining accumulation result of a previous group of data pairs, accumulating an accumulation result with a multiplication result of a next data pair until accumulation of multiplication results of the data pairs in the seventh group of data pairs is completed, and storing the accumulation result corresponding to the data pairs in the seventh group of data pairs in memory as the multiplication processing result for the multiplier and the multiplicand.

14. The non-transitory, computer-readable medium according to claim 13, wherein the multiplier and the multiplicand are each 256-bit numbers.

15. The non-transitory, computer-readable medium according to claim 13, the operations further comprising:
releasing a register that stores the multiplication result of each data pair when accumulating the multiplication results of each group of data pairs, and storing the accumulation result in three registers.

16. The non-transitory, computer-readable medium according to claim 13, wherein the computing device uses a 64-bit computer operating system.

17. The non-transitory, computer-readable medium according to claim 16, the operations further comprising:
randomly selecting four registers from registers RBX, RBP, R12, R13, R14, and R15 of the 64-bit computer operating system, and storing values of the selected registers in memory; and
obtaining the stored values of the selected registers from memory after the multiplication processing result for the multiplier and the multiplicand is obtained, and restoring the values of the selected registers.

18. The non-transitory, computer-readable medium according to claim 17, the operations further comprising:
selecting registers RAX, RCX, RDX, RSI, RDI, R8, R9, R10, and R11 from the 64-bit computer operating system, wherein the selected registers are all used for data storage in a data processing procedure.

* * * * *